US008506178B2

(12) United States Patent
Takeuchi et al.

(10) Patent No.: US 8,506,178 B2
(45) Date of Patent: Aug. 13, 2013

(54) MECHANICAL SPLICER APPARATUS FOR FIBER OPTIC CABLES

(75) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 148 days.

(21) Appl. No.: 13/167,928

(22) Filed: Jun. 24, 2011

(65) Prior Publication Data

US 2012/0328251 A1 Dec. 27, 2012

(51) Int. Cl.
 *G02B 6/255* (2006.01)
(52) U.S. Cl.
 USPC ............ 385/98; 385/95; 385/96; 385/97; 385/99; 385/100
(58) Field of Classification Search
 USPC ............ 385/95, 96, 97, 98, 99, 100, 105, 385/107
 See application file for complete search history.

(56) References Cited

U.S. PATENT DOCUMENTS

| | | | |
|---|---|---|---|
| 4,325,607 A | 4/1982 | Carlsen | |
| 4,940,307 A | 7/1990 | Aberson et al. | |
| 5,121,456 A | 6/1992 | Essert et al. | |
| 5,395,025 A | 3/1995 | Borer et al. | |
| 5,450,517 A | 9/1995 | Essert | |
| 5,812,718 A | 9/1998 | Carpenter et al. | |
| 6,033,124 A | 3/2000 | Lesueur et al. | |
| 6,122,936 A * | 9/2000 | Csipkes et al. | 65/485 |
| 6,203,213 B1 | 3/2001 | Seo et al. | |
| 6,325,547 B1 | 12/2001 | Cammons et al. | |
| 6,572,743 B2 | 6/2003 | Miller et al. | |
| 6,742,936 B1 | 6/2004 | Knecht et al. | |
| 6,955,479 B2 | 10/2005 | Erdman et al. | |
| 7,014,372 B2 | 3/2006 | Watte et al. | |
| 7,216,512 B2 | 5/2007 | Danley et al. | |

(Continued)

FOREIGN PATENT DOCUMENTS

| JP | 10-039161 | 2/1998 |
|---|---|---|
| WO | WO-99-27392 | 6/1999 |

(Continued)

OTHER PUBLICATIONS

International Search Report for PCT/US2012/043803, mailed Dec. 28, 2012.

(Continued)

*Primary Examiner* — Jennifer Doan
(74) *Attorney, Agent, or Firm* — White & Case LLP

(57) ABSTRACT

The invention provides and apparatus for mechanically splicing fiber optic cables and method for performing the process. The apparatus comprises an inventive segmented track with a middle track segment containing a splicer mount, and first and second rotating track segments on opposed sides of a middle segment, the rotating segments moving from a cleaving orientation wherein the rotating track segments align with a respective flat edge angled cleaver and a rounded edge angled cleaver, to a splicing orientation wherein the rotating track segments align with the middle track segment. First and second fiber key holders securely holding partially stripped fiber optic cables move along the respective first and second track segment for cleaving by the cleavers and then toward the middle track segment where their cleaved tips come into controlled aligned contact within a splicer joint contained in the splicer joint mount.

11 Claims, 7 Drawing Sheets

(56) References Cited

U.S. PATENT DOCUMENTS

| | | | |
|---|---|---|---|
| 7,270,487 | B2 | 9/2007 | Billman et al. |
| 7,369,738 | B2 | 5/2008 | Larson et al. |
| 7,572,064 | B2 | 8/2009 | deJong |
| 7,637,673 | B2 * | 12/2009 | Oike et al. ............... 385/98 |
| 7,658,549 | B2 * | 2/2010 | Elkins et al. .............. 385/76 |
| 7,680,384 | B2 | 3/2010 | Billman et al. |
| 7,712,974 | B2 | 5/2010 | Yazaki et al. |
| 7,822,309 | B2 | 10/2010 | Bianchi |
| 8,371,761 | B2 | 2/2013 | Heidler et al. |
| 2002/0031323 | A1 | 3/2002 | Hattori et al. |
| 2003/0081910 | A1 | 5/2003 | Gimbel et al. |
| 2006/0263028 | A1 | 11/2006 | Honma |
| 2009/0162019 | A1 | 6/2009 | Lichoulas et al. |
| 2011/0091166 | A1 | 4/2011 | Benjamin et al. |
| 2012/0328251 | A1 | 12/2012 | Takeuchi et al. |
| 2013/0008594 | A1 | 1/2013 | Takeuchi et al. |
| 2013/0022324 | A1 | 1/2013 | Takeuchi et al. |

FOREIGN PATENT DOCUMENTS

| | | |
|---|---|---|
| WO | WO-02-074505 | 9/2002 |
| WO | WO-03-003087 | 1/2003 |
| WO | WO 2012-178050 | 12/2012 |
| WO | WO 2013-006646 | 1/2013 |
| WO | WO 2013-012559 | 1/2013 |

OTHER PUBLICATIONS

Written Opinion for PCT/US2012/043803, mailed Dec. 28, 2012.
International Search Report for PCT/US2012/045457, mailed Jan. 3, 2013.
Written Opinion for PCT/US2012/045457, mailed Jan. 3, 2013.
International Search Report for PCT/US2012/045461, mailed Jan. 3, 2013.
Written Opinion for PCT/US2012/045461, mailed Jan. 3, 2013.

* cited by examiner

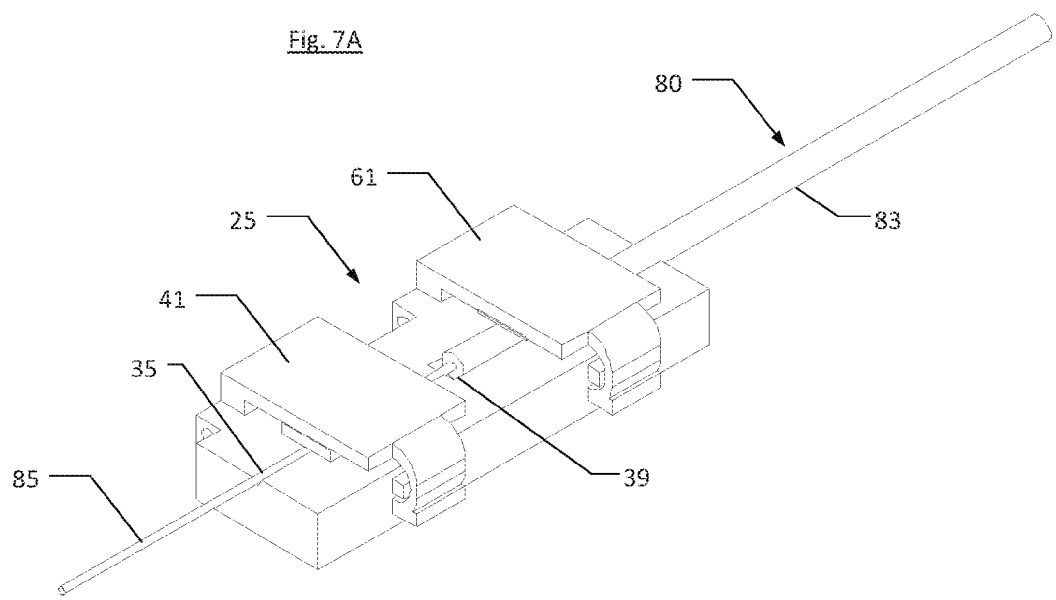
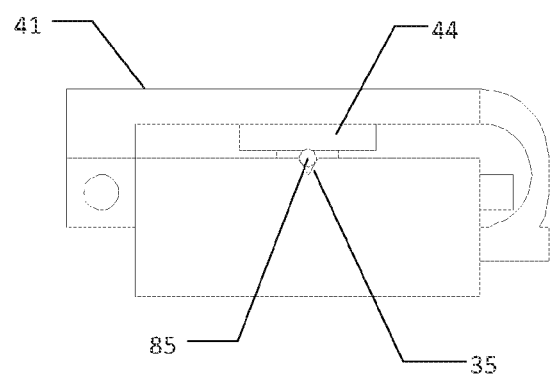

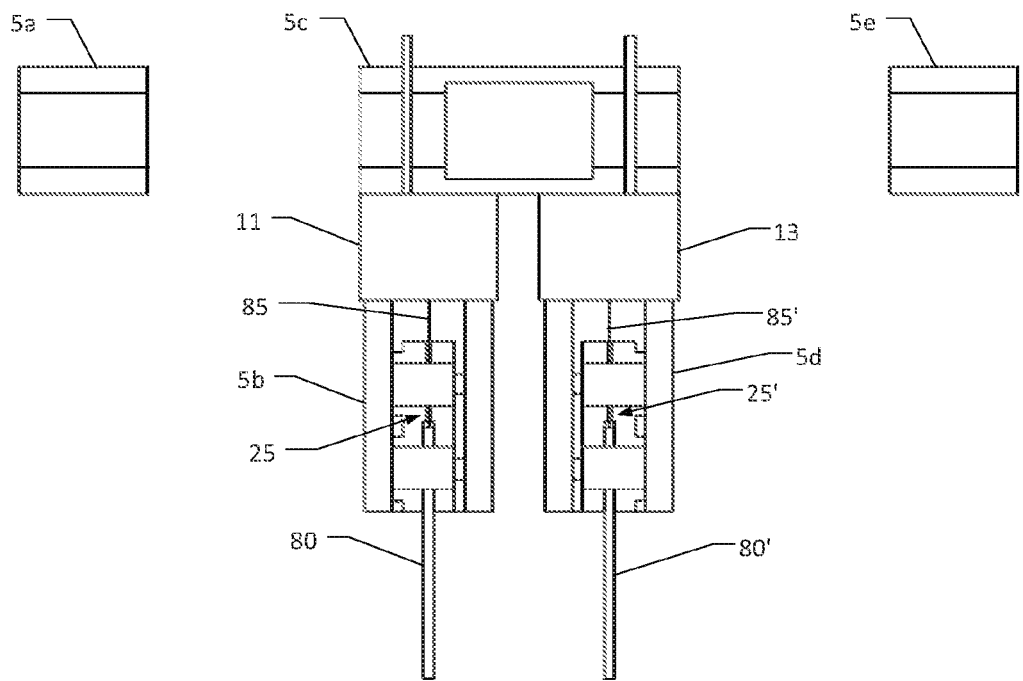
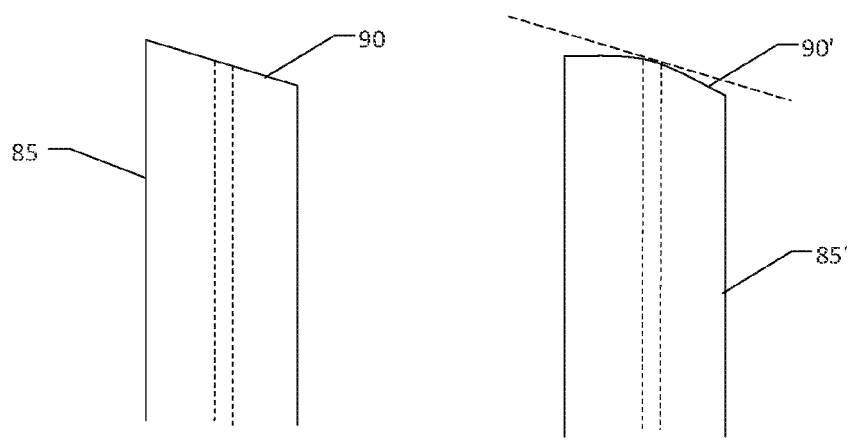

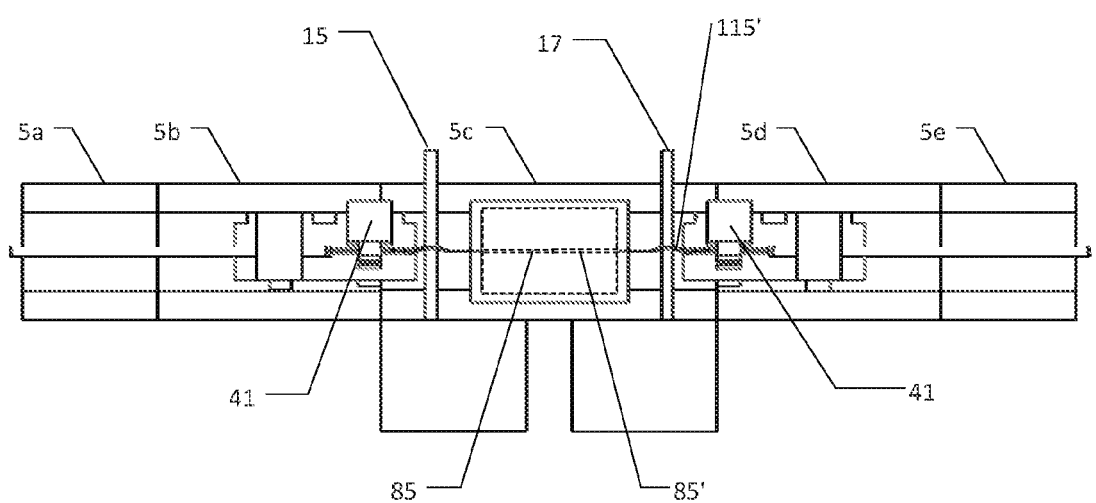

MECHANICAL SPLICER APPARATUS FOR FIBER OPTIC CABLES

FIELD OF THE INVENTION

The present invention relates to the field of fiber optics and terminations for optical fibers, particularly mechanical splicers for connecting the exposed ends of fiber optic cables. In particular, the invention concerns an improved mechanical splicer apparatus for connecting two fiber optic cables in an efficient low-cost manner that creates a splice with optimized insertion and return losses. The apparatus requires minimal equipment, may be used easily out in the field, and creates mechanical splices that are sufficient for use in the telecom communication industry. The apparatus also provides a high tolerance and optimized termination on the mechanical splicer joint to minimize mistakes during the splicing process.

BACKGROUND OF THE INVENTION

In the fiber optics communication industry, many companies have developed means by which optical fibers can be connected to one another. Splicers, in particular, come in two primary forms: fusion splicers and mechanical splicers. A fusion splicer physically fuses the ends of two optical fibers together by the application of heat, typically from an electrical arc. Fusion splicers are advantageous in that they create splices in which the insertion and return losses are precisely controlled. However, fusion splicing is complicated, expensive and requires advanced technical equipment not readily suited for use in the field, particularly if the local electric power required is not available.

A mechanical splicer is a junction of two fibers aligned with one another and held in place within a ferrule or similar assembly. The fibers are not physically joined as in a fusion splice. Rather, the fibers ends are held very close together with the optical index matching gel in between within the ferrule so that light can pass from one end to the other end with least amount of disturbance. Mechanical splicing is preferred for use in the field because of its ease in application and simplicity in terms of labor, training and equipment cost. However, mechanical splicing techniques developed to date have not been able to control insertion and return losses within prescribed limits required by many areas of the communications industry, thus as the max insertion loss below 0.3 dB, and max allowed return loss below −60~65 dB for SC/APC connectors.

Mechanical splicers for optical fibers have been used conventionally for about the last twenty years. During that period, various technology has been developed in the prior art to improve existing mechanical splicers. The improvements have focused on methods and devices for better aligning the ends of the fibers connected by the splicer. Alignment has been only slightly improved as a result of these efforts. Also, through improvements in the nature of the fiber manufacturer, the eccentricity, also referred to as concentricity, of the fibers has been improved, which in turn has resulted in better alignment of fiber ends during mechanical splicing. In addition, index matching gels (sometimes referred to as "JELs") have been developed in the prior art. Such gels are typically placed within the mechanical splicer to fill any slight gap, usually in the micrometer and nanometer range, between the fiber ends. Index matching gels provide a smooth continuity for light to pass through the gap and consequently control insertion and return losses. The prior art has improved the chemical stability of existing gels so that they can withstand drying, crystallizing and discoloring when subjected to temperature variations and aging. In particular, improvements have been made to ensure that the gels do not crystallize at low temperatures, do not evaporate at high temperatures, do not change colors during the course of its life time, and do not change the optical index too much under different environments. Designing such gels to achieve these improvements is complex and requires many technical manipulations. With all the proper investment, the optical matching gel issues have been resolved for the most part.

With advancements like those discussed above, the prior art has developed optical fiber mechanical splicers for use in the datacom grade. But the prior art has to date not been able to develop mechanical splicers for use in the telecom grade. In the telecom grade (such as the requirements provided by GR-20, GR-326), the connector itself is terminated in such a way that makes splicing easy, but the return loss specification was never very low enough (−64~65 dB). The problem with return loss is caused by the use of a flat cleaver to cut the fibers. With a flat cleaver, the cutting surface of the cleaver is perpendicular to the transmission axis of the fiber. Using a flat cleaver, the prior art methods could create a mechanical splice with a relatively controlled insertion loss, but the return toss (about −40 dB) was not controlled and not lowered enough due to the nature of the physical interfaces. In telecom communications, especially in the video grade, the industry requires a high ranking specification for return loss of greater than 60-65 dB in absolute value, or lower than −60~65 dB. The prior art methods using flat cleavers have been unable to create mechanical splicers that meet this requirement.

The prior art has previously used angled cleavers in developing connectors for optical fibers, such as angled physical contact ("APC") connectors. The APC connector is typically an 8° polished connector and is manufactured by several companies. In such a connector, the fiber is stripped, cleaved, cleaned and inserted into the ferrule with epoxy, then the connector is cured and endface is polished. The industry, however, still has not developed an efficient way to mechanically splice together two fibers that have been angle-cleaved, wherein the orientation/key is well aligned, and the two endfaces are well compromised for the required optical specifications. In particular, the industry has not developed an effective way of aligning angle-cleaved fibers in the creation of a mechanical splice to optimize insertion loss and return loss. Fibers are typically 125 μm in diameter. When two fibers are cleaved at 8°, it becomes very difficult to align the ends together such that the surface of contact is at an optimum (and the insertion loss and return loss are optimized). The prior art devices and methods have never been able to control this alignment in order to achieve the required optical specifications. Most manufactures simply slide the fiber ends together within a ferrule and are unable to control the surface contact. This leads to a very wide statistical variation in insertion loss and return loss values. Therefore, the true reliability is compromised.

SUMMARY OF THE INVENTION

The inventors have discovered that the problems associated with the prior art can be overcome through the use of a new mechanical splicing apparatus. The apparatus in one complete unit holds an inventive segmented track with a middle track segment containing a universal splicer mount, and first and second rotating track segments on opposed sides of a middle segment, the rotating segments moving from a cleaving orientation wherein the rotating track segments align with respective cleavers, to a splicing orientation where the rotating track segments align with the middle track segment. First and second fiber key holders securely holding partially stripped fiber optic cables move along the respective first and second track segment for cleaving by the cleavers and then toward the middle track segment where their cleaved tips come into contact within a splicer joint contained in the splicer joint mount.

In particular, the apparatus comprises a base frame, and a track mounted on the base frame. The track comprises a plurality of track segments, including, a middle track segment containing a universal splicer joint mount for receiving a splicer joint. The track also includes first and second rotating track segments that are disposed on opposite sides of the middle track segment. The first and second rotating track segments each rotate between a cleaving orientation and a splicing orientation. In the cleaving orientation, the rotating track segment is not aligned with the middle track segment. In the splicing orientation, the rotating track segment is aligned with the middle track segment. A flat edge angled cleaver is mounted on the frame and aligns with the first track segment when the first track segment is in the cleaving orientation. Similarly, and a rounded edge angled cleaver is mounted on the frame and aligns with the second track segment when the second track segment is in the cleaving orientation.

The apparatus further includes first and second fiber key holders for grasping first and second partially stripped fiber optic cables, respectively, with a stripped portion of each cable extending axially out of the fiber key holder. When locked, the first and second fiber key holders secure the radial orientation of each cable held therein, and prevent the cable from rotating during the cleaving and mechanical splicing processes.

With the first track segment oriented in the cleaving orientation, the first fiber key holder is inserted into the first track segment, which slidably receives the first fiber key holder. The first fiber key holder may then be moved into engagement with the flat edge angled cleaver for cleaving the stripped portion extending from the first fiber key holder to create a flat edge angled tip on the first fiber optic cable.

Similarly, with the second track segment oriented in the cleaving orientation, the second fiber key holder is inserted into the second track segment, which slidably receives the second fiber key holder. The second fiber key holder may then be moved into engagement with the rounded edge angled cleaver for cleaving the stripped portion extending from the second fiber key holder to create a rounded edge angled tip on the second fiber optic cable.

The first and second track segments are rotatable from the cleaving orientation to the splicing orientation. After the first and second track segments are both rotated to the splicing orientation, the first and second fiber key holders, containing the cleaved first and second fiber optic cables, may be moved toward the splicer joint from opposite directions. This also moves the flat edge angled tip of the first fiber optic cable and the rounded edge angled tip of the second fiber optic cable into the splicer joint and into aligned contact with one another with the optical index matching gel in between.

In one embodiment, each fiber key holder includes a base having a two-part longitudinal groove including a fiber groove for receiving a stripped portion of the fiber optic cable, and a cable groove for receiving a coated portion of the fiber optic cable. A fiber locker is disposed over the fiber groove, and the fiber locker moves between an open position wherein the fiber locker does not cover the fiber groove, and a closed position wherein the fiber locker covers the fiber groove and presses the stripped portion into the fiber groove to prevent it from rotating within the fiber key holder. Similarly, a cable locker is disposed over the cable groove and moves between an open position wherein the cable locker does not cover the cable groove, and into the cable groove to prevent it from rotating within the fiber key holder.

The fiber locker and cable locker may each comprise a flip-down cover hinge-mounted on the base, a rubber pad on the underside of the flip-down cover, a locker control hook mounted on an edge of the cover, and a locker slip mounted on the base. The locker control hook is capable of spring locking and unlocking over the locker slip. The rubber pad for pressing into the groove when the locker is closed.

The invention also comprises one or more bow adjustment mechanisms for creating a bow in either the first or second fiber optic cables when the first and second track segments are in the splicing orientation and the first and second fiber key holders are moved toward the splicer joint.

The fiber groove and cable groove in the fiber key holder may be any shape, for example, a v-groove shape. The flat edge angled cleaver and the rounded edge angled cleaver are set to cleave the first fiber and second fibers at particular angle, such as 8°, but other angles may also be used.

In a preferred embodiment, the first and second track segments rotate by a quarter turn. In another embodiment, the track comprises an upper flat edge and a longitudinal channel for slidably accommodating the first and second fiber key holders.

The invention also provides a method for mechanically splicing fiber optic cables using the apparatus according to the invention. The method includes placing first and second partially stripped fiber optic cables within the first and second fiber key holders and moving the fiber locker and cable locker on each fiber key holder to the closed position; inserting the first fiber key holder into the first track segment in the cleaving orientation with the stripped portion of the first fiber optic cable directed under the flat edge angled cleaver and cleaving the stripped portion to create a flat edge angled tip on the first fiber optic cable; inserting the second fiber key holder into the second track segment in the cleaving orientation with the stripped portion of the second fiber optic cable directed under the rounded edge angled cleaver and cleaving the stripped portion to create a rounded edge angled tip on the second fiber optic cable; retracting the first and second fiber key holders from the cleavers and rotating the first and second track segments to the splicing orientation and moving the first and second fiber key holders containing the cleaved first and second fiber optic cables toward the splicer joint from opposite directions for moving the flat edge angled tip of the first fiber optic cable and the rounded edge angled tip of the second fiber optic cable into the splicer joint and into aligned contact with one another.

The method may also include unlocking the fiber locker on the first and second fiber key holders after the cleaving step; when the first and second track segments are in the splicing orientation, moving the first and second fiber key holders containing the cleaved first and second fiber optic cables toward the splicer joint from opposite directions until a bow is seen in the one or more of the first and second fiber optic cables; inserting the one or more bow adjustment mechanisms to control the bow in the fiber optic cable; and crimping the splicer joint to mechanically fasten the first and second fibers in place within the splicer joint. This mechanical bow is to adjust the fiber axial force due to temperature caused optical cable stiffness. The rate and amount of bow is adjustable.

BRIEF DESCRIPTION OF THE DRAWINGS

This specification makes reference to the following figures wherein like reference numerals designate like parts in the figures.

FIG. 7A is an isometric view of the fiber key holder with a partially stripped fiber optic cable held therein.

FIG. 7B is a side view of FIG. 7A showing the rubber pad on the fiber locker pressing the stripped portion of the fiber optic cable down into the groove contained in the base of the fiber key holder.

FIG. 8 is a top view of the apparatus according to the invention with the rotating track segments in the cleaving orientation and fiber key holders (with partially stripped fiber optic cables held therein) inserted into each of the rotating track segments for cleaving by the respective cleavers mounted in the frame.

FIG. 9 is close-up view of the ends of the stripped portion of each fiber optic cable after cleaving in accordance with the invention.

FIG. 11 is a top view of the apparatus shown in FIG. 10A, with the fiber lockers in the first and second fiber key holder in open positions and with the first and second fiber key holders moved closer together than shown in FIG. 10A to generate a bow in the fiber optic cables.

DETAILED DESCRIPTION OF THE INVENTION

Figure 1:
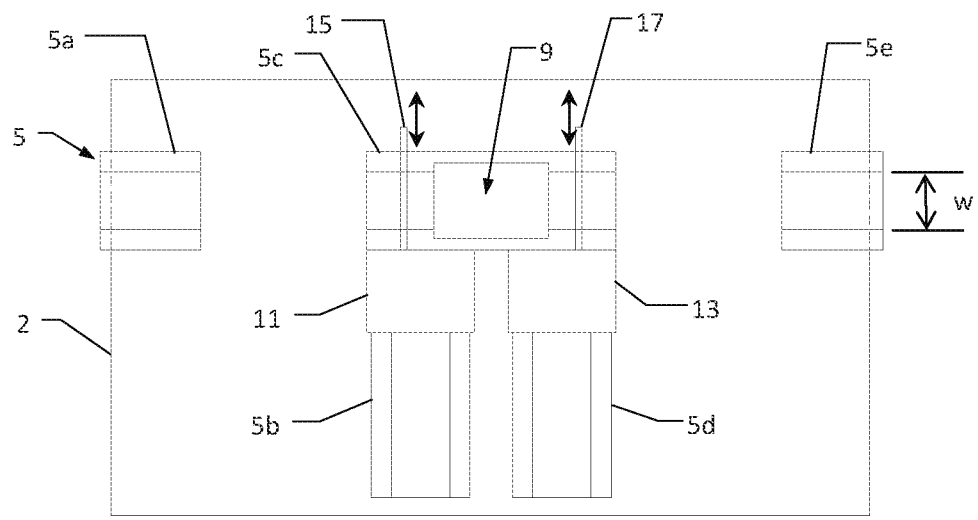
FIG. 1 is a top view of the apparatus according to the invention with the rotating track segments in the cleaving orientation.
Figure 2:
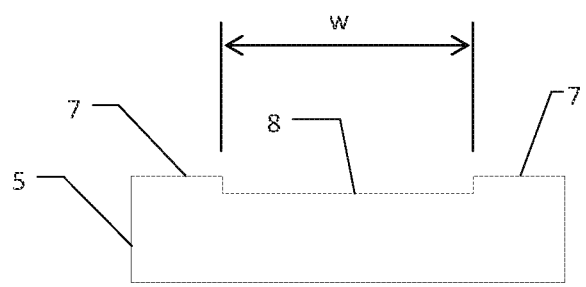
FIG. 2 is a side cross-section view of the track shown in FIG. 1 in accordance with the invention.
Figure 3:
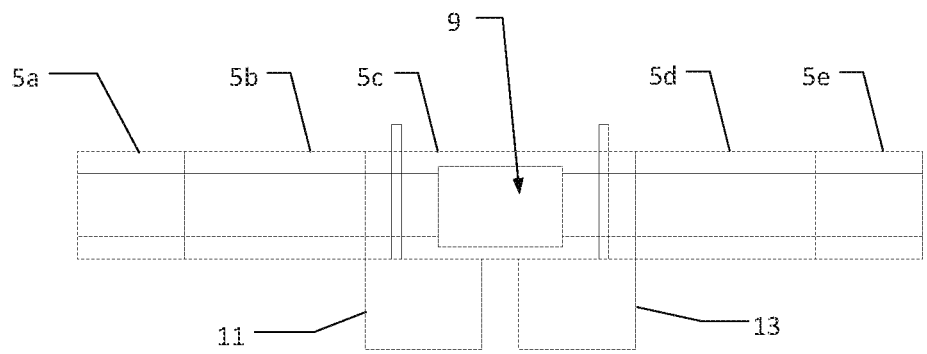
FIG. 3 is a top view of the apparatus according to the invention with the rotating track segments in the splicing orientation aligned with the middle track segment and external track segments.

The invention will first be described by reference to its structure and thereafter further described by reference to its operation. FIG. 1 shows a top view of the mechanical splicing apparatus according to the invention. The apparatus includes a base frame 2 on which is mounted a segmented track 5 comprising track segments 5a-5e. A first rotating track segment 5b is rotatable by a quarter turn and moves from a cleaving orientation shown in FIG. 1 to a splicing orientation shown in FIG. 3 so that it is disposed between and aligns with end track segment 5a and middle track segment 5c. Similarly, a second rotating track segment 5d is rotatable by a quarter turn and moves from a cleaving orientation shown in FIG. 1 to a splicing orientation shown in FIG. 3 so that it is disposed between and aligns with middle track segment 5c and end track segment 5c. FIG. 2 shows a cross-section of the track 5. Track 5 has an upper flat edge 7 and a longitudinal channel 8 of width w for slidably accommodating a fiber key holder 25 discussed below.

A splicer holder 9 is mounted on a universal mount point on middle track segment 5c and can accommodate many different splicer joints available on the market. A flat edge angled cleaver 11 (for example, made by IL Sintech Co. Ltd.) is mounted on the base frame and engages one end of the first rotating track segment 5b when the track segment is in the cleaving orientation. Flat edge angled cleaver 11 is capable of cleaving a stripped end of an optical fiber cable at a preset angle, such as 8°, with a flat edge. Rounded edge angled cleaver 13 (for example, made by Sumitomo Electric Lightwave Corp.) is mounted on the base frame and engages one end of the second rotating track segment 5d when the second track segment is in the cleaving orientation. Rounded edge angled cleaver 13 is capable of cleaving a stripped end of an optical fiber cable at a preset angle, such as 8°, with a rounded edge. In the field, the use of multiple un-mounted cleavers inevitably leads to mistakes, such as when the worker inadvertently uses the same cleaver to cut both fibers. The present invention overcomes this problem by mounting the cleavers 11 and 13 on the frame 2 and by mounting each fiber within a fiber key holder that does not move out from the apparatus once the cleaving and splicing operation is undertaken. This avoids mistakes.

Figure 4:
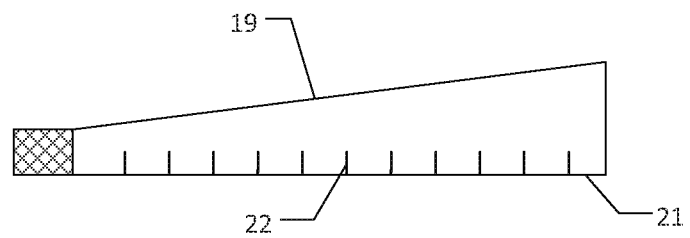
FIG. 4 is a side view of one of the bow adjustments in accordance with the invention.

Two bow adjustments 15 and 17 are slidably disposed on middle track segment 5c on opposite sides of the splicer holder 9. The bow adjustments 15 and 17 slide back and forth in the direction of the arrows shown in FIG. 1. FIG. 4 shows a side-view of the one of the bow adjustments. Each bow adjustment has an inclined slope 19 and a bottom edge 21. The bottom edge 21 rests on the upper flat edges 7 of track 5 as the bow adjustment slides back and forth. Each bow adjustment 15 and 17 contains a plurality of markings 22 used as a temperature index to create a bow in a portion of the optical fiber during the mechanical splicing process. This feature is discussed in greater detail below.

Figure 5:
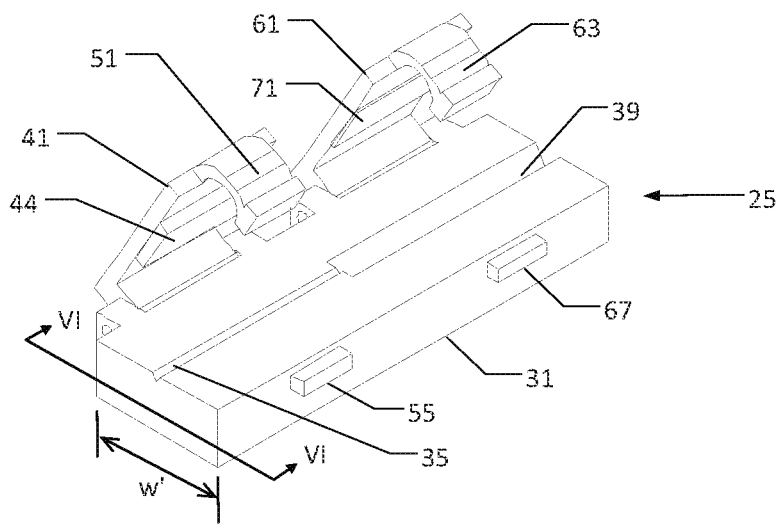
FIG. 5 is an isometric view of the fiber key holder in accordance with the invention.
Figure 6A:
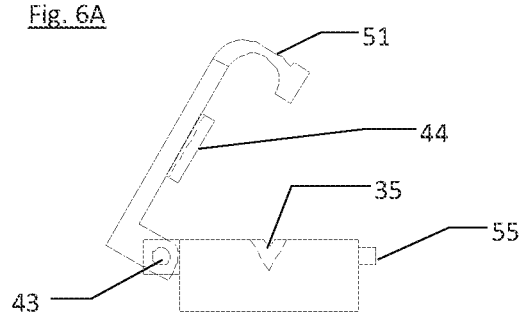
FIGS. 6A and 6b are side views of the base of the fiber key holder taken along lines VI-VI of FIG. 5.
Figure 6B:
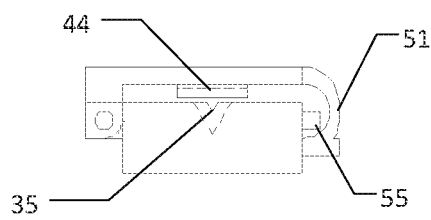

FIGS. 5-7 shows a fiber key holder 25 used in accordance with the invention. FIG. 5 shows an isometric view of the fiber holder 25. FIGS. 6A and 613 show a side-view of the fiber key holder 25 taken along lines VI-VI, in an open position and closed position, respectively. Referring to FIG. 5, the fiber key holder 25 includes a rectangular base 31. The base 31 has a width, w', approximately equal to the width w of the channel 8. (See FIG. 2.) In this manner, the fiber key holder is capable of sliding within the channel 8. The base 31 contains a longitudinal v-groove composed of two co-axial portions, a fiber v-groove 35 and a cable v-groove 39. A fiber locker 41 mounted on a hinge 43 (see FIG. 6A) is disposed over the fiber v-groove 35 and moves from an open position (FIG. 6A) to a closed position (FIG. 6b). The fiber locker 41 contains a rubber pad 44 for pressing into the fiber v-groove 35 when the locker is in the closed position. The fiber locker 41 contains a locker control hook 51 capable of spring locking and unlocking over a locker slip 55. As shown in FIG. 6A, when the fiber locker 41 is in the open position, locker control hook 51 is not engaged to the locker slip 55. As shown in FIG. 6B, when the fiber locker is in the closed position, locker control hook 51 spring locks over the locker slip 55. Thereafter, the locker control hook 51 may be unlocked from the locker slip 55 and the fiber locker 41 may be moved back to the open position. Referring again to FIG. 5, a hinged cable locker 61, containing a locker control hook 63, a locker slip 67, and rubber pad 71 is disposed over the cable v-groove 39 and is capable of moving between opened and closed positions in the same manner as the fiber control locker 41.

The invention is now further described by way of its operation. With reference to FIG. 7A, a first optical fiber cable 80 containing an outer coating 83 and an interior fiber 85 is partially stripped of its coating 83. The exposed interior fiber 85 is then cleaned. Thereafter, the first partially stripped fiber optic cable 80 is placed within a first fiber holder 25 with the interior fiber 85 lying within the fiber v-groove 35 and extending axially out of the fiber holder, and the coated portion 83 lying within the cable v-groove 39 and extending axially out of the fiber holder 25. The fiber locker 41 and cable locker 61 are then moved to their locked positions. Referring to FIG. 7B, when the fiber locker 41 is in the locked position, the rubber pad 44 presses the interior fiber 85 into the fiber v-groove 35. Similarly, when the cable locker 61 is in the locked position the rubber pad 71 presses the coated cable 83 into the cable v-groove 39. Once the fiber locker 41 and cable locker 61 are in their locked positions, the radial orientation of the partially stripped fiber optic cable 80 with respect to the fiber holder 25 is locked and it is incapable of twisting within the fiber holder 25. In other words, the so-called "key" is preserved. A similar process is also performed on a second partially stripped fiber optic cable 80' to lock it into a second fiber holder 25', as shown in the figures discussed below.

As shown in FIG. 8, the first fiber holder 25 is inserted into the first rotating track segment 5b with the exposed interior fiber 85 directed under flat angled cleaver 11. The flat angled cleaver 11 is depressed to cut the end of the fiber at an angle of approximately 8° to create a flat edge angled tip 90, as shown in FIG. 9. A similar process is repeated for a second optical fiber 80'. In particular, the second fiber holder 25' carrying second optical fiber 80' is inserted into the second rotating track segment 5d with the exposed interior fiber 85' directed under round edge angled cleaver 13. The rounded edge cleaver 13 is depressed to cut the end of the fiber at an angle of approximately 8° to create a rounded edge angled tip 90', as shown in FIG. 9.

Figure 10A:
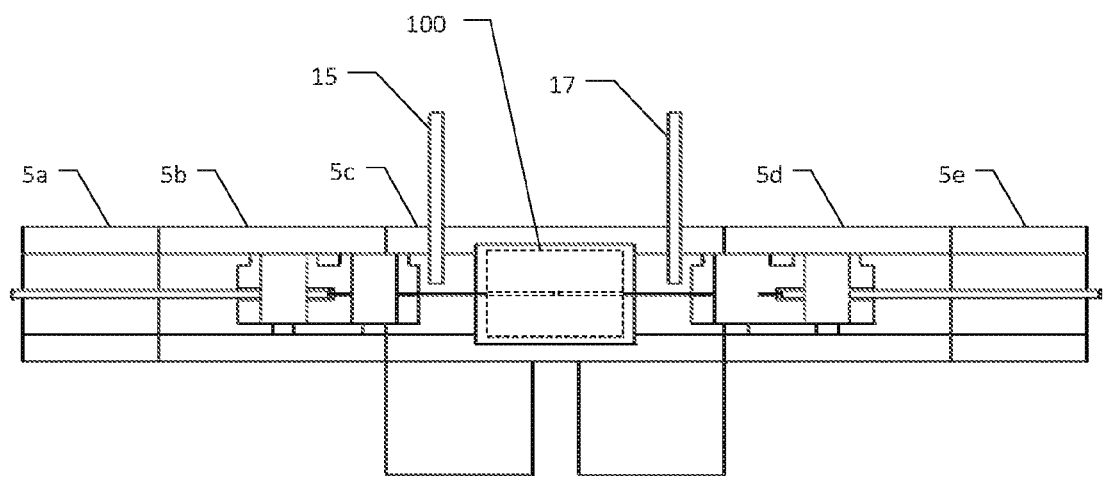
FIG. 10A is a top view of the apparatus according to the invention with the rotating track segments in the splicing orientation and the first and second fiber key holders (containing the cleaved fibers) moved from opposite directions towards the splicer joint contained with the splicer mount on the middle track segment.

After cleaving, the first and second fiber holders 25 and 25' (containing fiber 80 and 80' with cleaved tips 90 and 90') are retracted out from cleavers 11 and 13 and back into the first and second track segments 5b and 5d, respectively. Because the fiber holders 25 and 25' were locked during cleaving process, the fiber cables 80 and 80' within the holders are not subject to any rotation during the cleaving process and their respective radial orientation is preserved. As shown in FIG. 10A, first rotating track segment 5b (with the first fiber holder 25 therein) is then rotated to its splicing orientation into alignment with end track segment 5a and middle track segment 5c. Likewise, second rotating track segment 5d (with the second fiber holder 25' therein) is rotated into its splicing orientation into alignment with middle track segment 5c and end track segment 5e. At this point, the bow adjustment 15 and 17 are moved outward so they are not in the path of the channel 8 along middle track segment 5e. The first and second fiber holders 25 and 25' are then pushed from opposite directions inwards toward a splicer joint 100 (shown in dashed line) contained within the splicer joint holder 9 until the ends 90 and 90' of the fibers come into contact with one another.

Figure 10B:
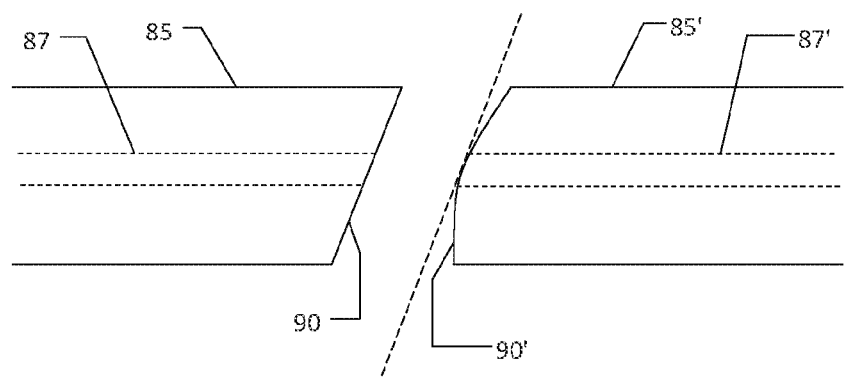
FIG. 10B is a close-up view of a portion of FIG. 10A, showing the flat edge angled tip of the first fiber optic cable and the rounded edge angled tip of the second fiber optic cable coming into contact with another within the splicer joint.

FIG. 10B shows a close-up view of the fiber ends 90 and 90' coming into contact with one another within the splicer joint 100. The first fiber 85 has a center axis 87 and second fiber 85' also has a center axis 87'. The fibers 85 and 85' are typically 125 µm in diameter and the coating 83 encasing the fibers has a greater diameter, typically about 900 µm. In the invention, the first fiber optic cable is cleaved to have a flat edge 8° angled tip 90, and the second fiber optic cable is cleaved to have a rounded edge 8° angled tip 90'. This combination provides the highest field orientation tolerance, but still maintains the highest optical performance in terms of insertion loss and return loss. If the fiber tips were both angle-cleaved with flat edges, when they were inserted together, the ideal theoretical situation would be that the fiber tips are oriented radially complementary to one another so that the cleaved ends come together in a perfect coplanar fashion. However, if the radial orientation of one fiber were rotated (even slightly) relative to the other fiber, when the fibers were brought together the abutting cleaved ends would not be coplanar. If the abutting ends were not coplanar, an artificial gap would result between the two ends and cause an unnecessary increase in insertion losses (even with use of a gel). In addition, a gap could arise because the tolerance in the cleaving apparatus may result in fiber ends that are not cleaved at exactly the same angle (e.g., one fiber end is cleaved at 7.7° and the other fiber end is cleaved at 8.3°). The invention counteracts these problems by angle-cleaving the first fiber 85 at 8° with a flat edge, and angle-cleaving the second fiber 85' at 8° in a tangential direction with a rounded edge. The rounded edge angled tip 90' on the second fiber 85' allows for some tolerance when the fiber tips are brought together. In other words, when the two fibers tips are brought together within the splicer joint 100, the center axes 87 and 87' will be aligned and touch one another even if the fiber tips are slightly offset from one another in terms of their relative radial orientation.

As shown in FIG. 11, the fiber locker 41 on the first and second fiber holders 25 and 25' is then unlocked. It may also be unlocked at an earlier time after the cleaving has been performed. However, the cable locker 61 on each fiber holder 25 and 25' remains locked until the mechanical splice is completed. This preserves the radial orientation of the fiber with respect to the holder. The first and second fiber holders 25 and 25' are then pushed a slight amount more toward one another until a bow 115 is seen in the first fiber 85 and a bow 115' is seen in the second fiber 85' on each side of the splicer joint 100. The presence of the bow is an indication of good contact between the tips 90 and 90' of the fibers. At this point, bow adjustment 15 is moved under bow 115 and bow adjustment 17 is moved under bow 115' in order to provide a gauge on the size of the bow. The size of the bow used is determined by the temperature at which the operation is performed. The markings 22 on the side of each bow adjustment may be used as for that purpose. At low temperatures, which typically require a larger bow, the bow adjustments 15 and 17 may be move inwardly to increase the bow. At room temperature, a bow is often not needed. The bows will ensure certain forces in the axial direction that guaranty the gap distance between the fiber ends 90 and 90 inside the splicer joint 100 will be controlled. While the above description utilizes bows and bow adjustments on both sides of the splicer joint 100, conditions may be such that only one bow adjustment is needed.

After the bow adjustments are made to account for the temperature, the splicer joint 100 is then locked/crimped in a conventional manner to mechanically fasten the fibers 85 and 85' in place so that fiber end 90 and 90' remain abutting one another in the proper radial orientation. Thereafter, the cable locker 61 on each fiber holder 25 and 25' is moved to its open position and the spliced cables and mechanical splicer may be removed from the apparatus.

In addition to the embodiments of the present invention described above, those skilled in the an will be able to arrive at a variety of other arrangements and steps which, if not explicitly described in this document, nevertheless embody the principles of the invention and fall within the scope of the appended claims.

What is claimed is:

1. An apparatus for mechanically splicing fiber optic cables, the apparatus comprising:

a base frame;

a track mounted on the base frame, the track comprising a plurality of track segments, including,
   a middle track segment containing a splicer joint mount for receiving a splicer joint; and
   first and second rotating track segments disposed on opposite sides of the middle track segment, the first and second rotating track segments each having (i) a cleaving orientation wherein the track segment is not aligned with the middle track segment and (ii) a splicing orientation wherein the track segment is aligned with the middle track segment;
a flat edge angled cleaver mounted on the frame and aligned with the first track segment when the first track segment is in the cleaving orientation;
a rounded edge angled cleaver mounted on the frame and aligned with the second track segment when the second track segment is in the cleaving orientation; and
first and second fiber key holders for grasping first and second partially stripped fiber optic cables, respectively, wherein a stripped portion of each cable extends axially out of the fiber key holder and the radial orientation of the cable with respect to the fiber key holder is secured;
the first track segment in the cleaving orientation slidably receiving the first fiber key holder, whereby the first fiber key holder is capable of movement into engagement with the flat edge angled cleaver for cleaving the stripped portion extending from the first fiber key holder to create a flat edge angled tip on the first fiber optic cable;
the second track segment in the cleaving orientation slidably receiving the second fiber key holder, whereby the second fiber key holder is capable of movement into engagement with the rounded edge angled cleaver for cleaving the stripped portion extending from the second fiber key holder to create a rounded edge angled tip on the second fiber optic cable;
the first and second track segments rotatable to the splicing orientation, whereby the first and second fiber key holders containing the cleaved first and second fiber optic cables are capable of movement toward the splicer joint from opposite directions for moving the flat edge angled tip of the first fiber optic cable and the rounded edge angled tip of the second fiber optic cable into the splicer joint and into aligned contact with one another.

2. An apparatus for mechanically splicing fiber optic cables according to claim 1, wherein each fiber key holder comprises:
   a base having a two-part longitudinal groove including a fiber groove for receiving a stripped portion of the fiber optic cable, and a cable groove for receiving a coated portion of the fiber optic cable;
   a fiber locker disposed over the fiber groove, the fiber locker movable between an open position wherein the fiber locker does not cover the fiber groove, and a closed position wherein the fiber locker covers the fiber groove for pressing the stripped portion into the fiber groove to prevent it from rotating within the fiber key holder; and
   a cable locker disposed over the cable groove, the cable locker movable between an open position wherein the cable locker does not cover the cable groove, and a closed position wherein the cable locker covers the cable groove for pressing the coated portion into the cable groove to prevent it from rotating within the fiber key holder.

3. The apparatus according to claim 2, wherein the fiber locker and cable locker each comprise a flip-down cover hinge-mounted on the base, a rubber pad on the underside of the flip-down cover, a locker control hook mounted on an edge of the cover, and a locker slip mounted on the base, the locker control hook capable of spring locking and unlocking over the locker slip, and the rubber pad for pressing into the groove when the locker is closed.

4. The apparatus according to claim 3, further comprising one or more bow adjustment mechanisms for creating a bow in the either the first or second fiber optic cables when the first and second track segments are in the splicing orientation and the first and second fiber key holders are moved toward the splicer joint.

5. The apparatus according to claim 4, wherein the fiber groove and cable groove in the fiber key holder has a v-groove shape.

6. The apparatus according to claim 5, wherein the flat edge angled cleaver and the rounded edge angled cleaver are set to cleave the first fiber and second fibers, respectively, at an angle of 8°.

7. The apparatus according to claim 6, wherein the first and second track segments rotate by a quarter turn.

8. The apparatus according to claim 7, wherein the track comprises an upper flat edge and a longitudinal channel for slidably accommodating the first and second fiber key holders.

9. The apparatus according to claim 8, wherein the splicer joint is a conventional assembly.

10. A method for mechanically splicing fiber optic cables using the apparatus of claim 1, the method comprising:
   placing first and second partially stripped fiber optic cables within the first and second fiber key holders and moving the fiber locker and cable locker on each fiber key holder to the closed position;
   inserting the first fiber key holder into the first track segment in the cleaving orientation with the stripped portion of the first fiber optic cable directed under flat edge angled cleaver and cleaving the stripped portion to create a flat edge angled tip on the first fiber optic cable;
   inserting the second fiber key holder into the second track segment in the cleaving orientation with the stripped portion of the second fiber optic cable directed under rounded edge angled cleaver and cleaving the stripped portion to create a rounded edge angled tip on the second fiber optic cable;
   retracting the first and second fiber key holders from the cleavers and rotating the first and second track segments to the splicing orientation and moving the first and second fiber key holders containing the cleaved first and second fiber optic cables toward the splicer joint from opposite directions for moving the flat edge angled tip of the first fiber optic cable and the rounded edge angled tip of the second fiber optic cable into the splicer joint and into aligned contact with one another.

11. The method of claim 10, further comprising:
   unlocking the fiber locker on the first and second fiber key holders after the cleaving step;
   when the first and second track segments are in the splicing orientation, moving the first and second fiber key holders containing the cleaved first and second fiber optic cables toward the splicer joint from opposite directions until a bow is seen in the one or more of the first and second fiber optic cables;
   inserting the one or more bow adjustment mechanisms to control the bow in the fiber optic cable; and
   crimping the splicer joint to mechanically fasten the first and second fibers in place within the splicer joint.

* * * * *